United States Patent
Lim et al.

(10) Patent No.: US 8,625,478 B2
(45) Date of Patent: Jan. 7, 2014

(54) HYBRID AUTOMATIC REPEAT REQUEST SYSTEM AND METHOD THEREOF IN A COMMUNICATION SYSTEM

(75) Inventors: Chi-Woo Lim, Suwon-si (KR); Song-Nam Hong, Seoul (KR); Mi-Hyun Lee, Seoul (KR); Dong-Seek Park, Yongin-si (KR); Ho-Kyu Choi, Seongnam-si (KR); Jae-Weon Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 940 days.

(21) Appl. No.: 12/011,328

(22) Filed: Jan. 25, 2008

(65) Prior Publication Data
US 2008/0198788 A1   Aug. 21, 2008

(30) Foreign Application Priority Data
Jan. 25, 2007   (KR) .................. 10-2007-0007878

(51) Int. Cl.
*H04B 7/14*   (2006.01)
(52) U.S. Cl.
USPC .......................................... 370/315
(58) Field of Classification Search
None
See application file for complete search history.

(56) References Cited

U.S. PATENT DOCUMENTS

| | | | |
|---|---|---|---|
| 7,035,894 B2 | 4/2006 | Park et al. | |
| 2005/0181832 A1* | 8/2005 | Ishii et al. | 455/562.1 |
| 2008/0133995 A1* | 6/2008 | Lohr et al. | 714/748 |
| 2008/0227443 A1* | 9/2008 | Whinnett | 455/422.1 |
| 2008/0298387 A1* | 12/2008 | Lohr et al. | 370/467 |

FOREIGN PATENT DOCUMENTS

| | | |
|---|---|---|
| KR | 10-2001-0090989 | 10/2001 |
| KR | 10-2006-0008821 | 1/2006 |
| WO | WO 2005/071874 A1 | 8/2005 |

* cited by examiner

Primary Examiner — John Blanton

(57) ABSTRACT

A method to transmit a packet of a BS in a communication system using a HARQ scheme is provided. The method includes assigning resource for transmitting a packet to a mobile station, and transmitting a first packet to the mobile station using the assigned resource; transmitting timing information on which a second packet is transmitted to the mobile station when the BS does not receive information indicating that the mobile station decoded the first packet successfully or when the BS receives information indicating that the mobile station failed to decode the first packet; and transmitting the second packet to the mobile station on a timing point corresponding to the timing information.

19 Claims, 4 Drawing Sheets

HYBRID AUTOMATIC REPEAT REQUEST SYSTEM AND METHOD THEREOF IN A COMMUNICATION SYSTEM

CROSS-REFERENCE TO RELATED APPLICATION(S) AND CLAIM OF PRIORITY

This application claims the benefit under 35 U.S.C. §119(a) of an application filed in the Korean Intellectual Property Office on Jan. 25, 2007 and assigned Serial No. 2007-7878, the entire contents of which are incorporated herein by reference.

TECHNICAL FIELD OF THE INVENTION

The present invention relates generally to a communication system, and in particular, to a Hybrid Automatic Retransmission reQuest (HARQ) system and method thereof in a communication system.

BACKGROUND OF THE INVENTION

Generally, an error control scheme used in a communication system is classified into a Forward Error Correction (FEC) scheme and an Automatic Repeat Request (ARQ) scheme.

The FEC scheme corrects an error in received information using a code having an error correction capability, and is used when there is no feedback channel used by a receiver to transmit, to a transmitter, information indicating whether it has successfully received the information transmitted by the transmitter.

The ARQ scheme uses a Cyclic Redundancy Check (CRC) code having high error detection capability, wherein upon detecting an error in received information, a receiver sends a request for retransmission of the defective information to a transmitter.

The FEC scheme has a problem that a data containing an error is maintained when a receiver fails to correct the error. So, the FEC scheme must use a powerful code to correct a plurality of errors to implement a system to ensure high reliability. But, the powerful code increases decoding complexity. The ARQ scheme, though it has a simple structure and high reliability, suffers a drastic reduction in information throughput at a high channel error rate. The HARQ scheme has advantages of both the ARQ scheme and the FEC scheme.

The HARQ scheme is classified into a synchronous HARQ scheme, an asynchronous HARQ scheme, an adaptive HARQ scheme, and a non-adaptive HARQ scheme according to whether a transmission timing point of a retransmitted packet, quantity of resource, and location of the resource are varied.

The synchronous HARQ scheme is a scheme that a transmitter transmits a retransmitted packet in a predetermined period according to a transmission timing point of the retransmitted packet. The asynchronous HARQ scheme is a scheme that a transmitter transmits a retransmitted packet on a packet retransmission timing point determined by a scheduler.

Also, quantity and location of assigned resource vary when the adaptive HARQ scheme is used. On the contrary, quantity and location of assigned resource are fixed when the non-adaptive HARQ scheme is used.

It is preferable to use synchronous HARQ scheme with a fixed retransmission timing point and non-adaptive HARQ scheme with a fixed quantity and location of assigned resource to reduce signaling overhead. But, it is preferable to use asynchronous HARQ scheme with a scheduling gain and adaptive HARQ scheme without consideration for a signaling overhead.

As described above, since signaling overhead can be incurred for a scheduling gain, there is a need that the scheduling gain must be given up to minimize the signaling overhead. So, there is a need for a new HARQ scheme to reduce the signaling overhead and consider the scheduling gain.

SUMMARY OF THE INVENTION

To address the above-discussed deficiencies of the prior art, it is a primary object of the present invention to provide a HARQ system to minimize a signaling overhead and to provide a scheduling gain in a communication system and method thereof.

According to the present invention, there is provided a method to transmit a packet of a base station (BS) in a communication system using a Hybrid Automatic Repeat reQuest (HARQ) scheme. The method includes assigning resource for transmitting a packet to a mobile station (MS), and transmitting a first packet to the MS using the assigned resource; transmitting timing information on which a second packet is transmitted to the MS when the BS does not receive information indicating that the MS decoded the first packet successfully or when the BS receives information indicating that the MS failed to decode the first packet; and transmitting the second packet to the MS on a timing point corresponding to the timing information.

According to the present invention, there is provided a method to receive a packet of a mobile station (MS) in a communication system using a Hybrid Automatic Repeat reQuest (HARQ) scheme. The method includes receiving a first packet from a base station (BS); decoding the first packet, and transmitting information indicating that the decoding of the first packet failed when the decoding of the first packet has failed; receiving timing information from the BS; and receiving a second packet on a timing point corresponding to the timing information.

According to the present invention, there is provided a communication system. The system includes a base station (BS); and a mobile station (MS), wherein the BS assigns resource for transmitting a packet to the MS, transmits a first packet to the MS using the assigned resource, transmits timing information on which a second packet is transmitted to the MS when the BS does not receive information indicating that the MS decoded the first packet successfully or when the BS receives information indicating that the MS failed to decode the first packet, and transmits the second packet to the MS on a timing point corresponding to the timing information, wherein the MS receives the first packet from the BS, and decodes the first packet, and transmits information indicating that the decoding of the first packet failed when the decoding of the first packet has failed, receives the timing information from the BS, and receives the second packet on a timing point corresponding to the timing information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication systems.

The present invention proposes a Hybrid Automatic Retransmission reQuest (HARQ) system to minimize a signaling overhead and to maximize a scheduling gain in a communication system and method thereof.

Figure 1:
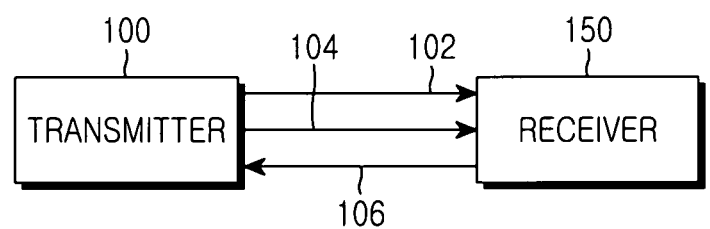
FIG. 1 is a block diagram illustrating a structure of a transmitter/receiver using a HARQ scheme and a signal flow between the transmitter and the receiver according to the present invention.

FIG. 1 is a block diagram illustrating a structure of a transmitter/receiver using a HARQ scheme and a signal flow between the transmitter and the receiver according to the present invention.

Referring to FIG. 1, a transmitter 100 transmits an information on a packet be transmitted using a control channel 102, and a receiver 150 receives the information and recognizes a control information on the packet. The transmitter 100 transmits the packet using a traffic channel 104, and the receiver 150 receives the packet, and decodes the received packet. Here, transmission of the control information and the packet can be performed simultaneously.

When the receiver 150 succeeds in decoding the received packet, the receiver 150 transmits an Acknowledgement (ACK) signal using a control channel 106. When the receiver 150 fails to decode the packet, the receiver 150 transmits a Negative Acknowledgement (NAK) signal using the control channel 106. Here, the ACK signal includes information indicating that the decoding of the received packet is successful, and the NAK signal includes information indicating that the decoding of the received packet is failed. After receipt of the NAK signal from the receiver 150, the transmitter 100 performs a packet retransmission. The packet retransmission can be performed repetitively until it is successful to a packet decoding or it is not exceeded a predetermined maximum retransmission times of a system.

The information on the packet transmitted by the transmitter 100 includes information capable of distinguishing each of users, for example, Connection Identifier (CID) information, information on a modulation scheme and a coding rate of a packet, and resource assignment information. For example, the resource assignment information includes information on a location of assigned resource and a size of the assigned resource. Here, it is unnecessary that the information on the modulation scheme and the coding rate of the packet, and the resource assignment information is retransmitted when a quantity of assigned resource, and a location of the assigned resource are fixed.

In the present invention, for the sake of convenience, a HARQ scheme will be described that a scheduler can determine a retransmission timing point of a packet, and a quantity and a location of resource used for transmitting a packet are fixed.

In a conventional asynchronous HARQ scheme, each of an information quantity used for an initial transmission of a data and an information quantity used for a retransmission of a data has a full information quantity. On the contrary, in an asynchronous HARQ scheme according to the present invention, one of a timing indicator and a timing information instead of the full information quantity is transmitted when a data is retransmitted, so signaling overhead can be minimized.

Figure 2:
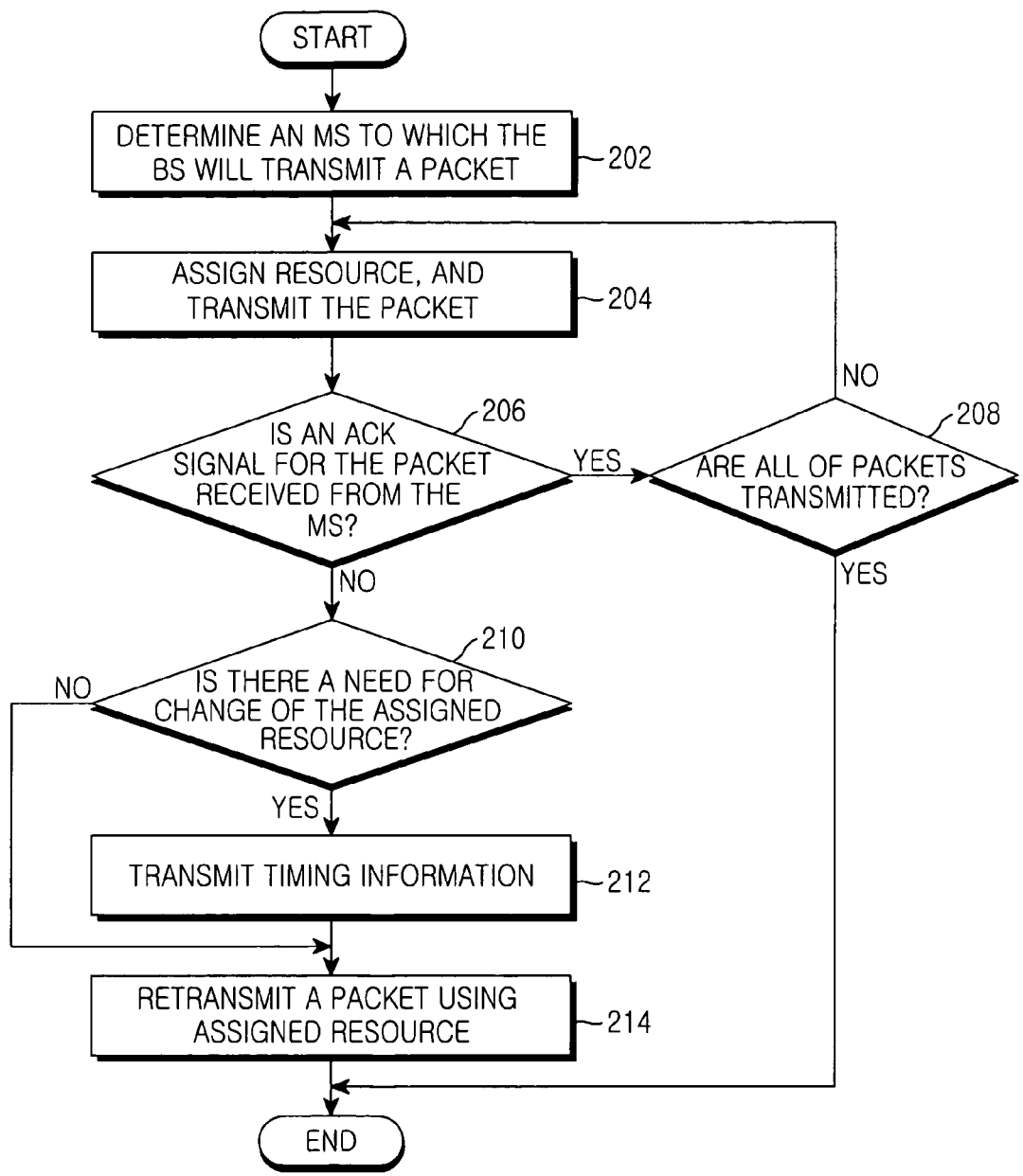
FIG. 2 is a flowchart illustrating a HARQ operation of a Base Station (BS) according to the present invention.

FIG. 2 is a flowchart illustrating a HARQ operation of a Base Station (BS) according to the present invention.

Referring to FIG. 2, the BS determines a Mobile Station (MS) to which the BS will transmit a packet in step 202. The BS assigns resource for transmitting the packet to the MS, and transmits the packet using the assigned resource in step 204.

The BS checks whether an ACK signal for the transmitted packet is received from the MS in step 206. When the ACK signal for the transmitted packet is received from the MS, the BS checks whether all of packets are transmitted in step 208. When all of the packets are not transmitted, the BS proceeds to step 204, and transmits another packet.

The BS receives a NAK signal from the MS, and checks whether there is a need for change of the assigned resource to the MS in step 210. When there is a need for assigning the assigned resource to a new MS different from the MS, the BS notifies to the MS that there is a change of the assigned resource. The BS transmits timing information to the MS in step 212. Here, the MS received the timing information can receive a packet using an initially assigned resource, and recognizes that the MS can receive a packet on a timing point corresponding to the timing information. The BS retransmits a packet to the MS using already assigned resource in step 214.

The BS can transmit the timing information corresponding to a channel state between the BS and the MS, for example, a DownLink (DL) channel state. That is, the BS transmits timing information when the channel state between the BS and the MS is better than a threshold channel state. Therefore, the MS can normally receive the timing information.

Figure 3:
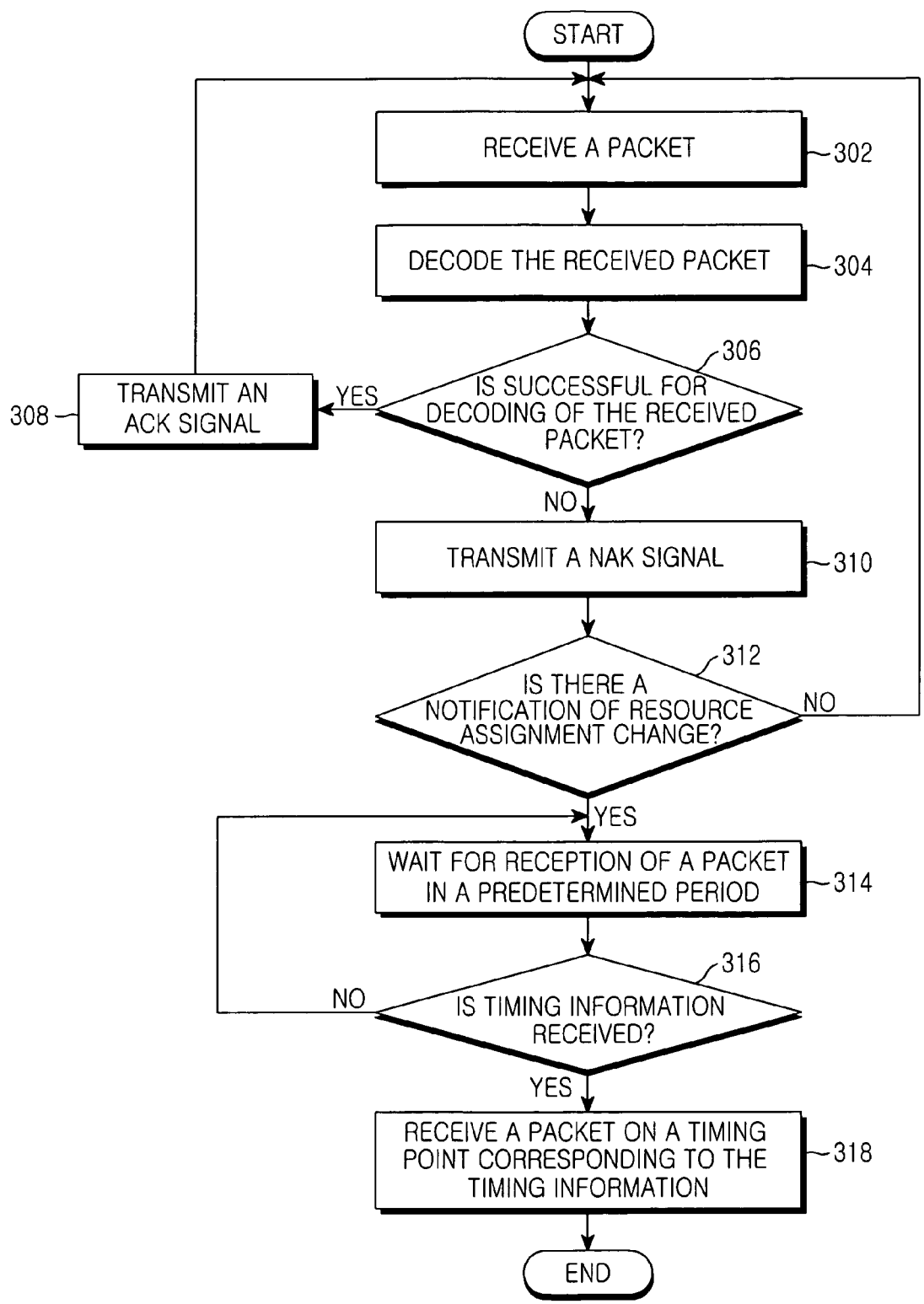
FIG. 3 is a flowchart illustrating a HARQ operation of a Mobile Station (MS) according to the present invention.

FIG. 3 is a flowchart illustrating a HARQ operation of an MS according to the present invention.

Referring to FIG. 3, the MS receives a packet using resource assigned by a BS in step 302. The MS decodes the received packet in step 304. The MS checks whether the decoding of the received packet is successful in step 306. When the decoding of the received packet is successful, the MS transmits an ACK signal to the BS in step 308. When the decoding of the received packet failed, the MS transmits a NAK signal to the BS in step 310. The MS checks whether there is a notification of resource assignment change from the BS in step 312. When there is no notification of the region assignment change from the BS, the MS proceeds to step 302, and receives a packet using already assigned resource in step 302.

When there is the notification of the resource assignment change from the BS, the MS waits for reception of a packet whenever a predetermined period has passed in step 314. The MS checks whether timing information is received from the BS in step 316. When the timing information is received from the BS, the MS receives a packet using already assigned resource on a timing point corresponding to the timing information in step 318.

As describe above, an MS maintains an initially assigned region and a Modulation and Coding Scheme (MCS) level until the MS receives timing information. After reception of the timing information, the MS receives again a packet using the initially assigned resource and the MCS level on a timing point corresponding to the timing information.

Figure 4:
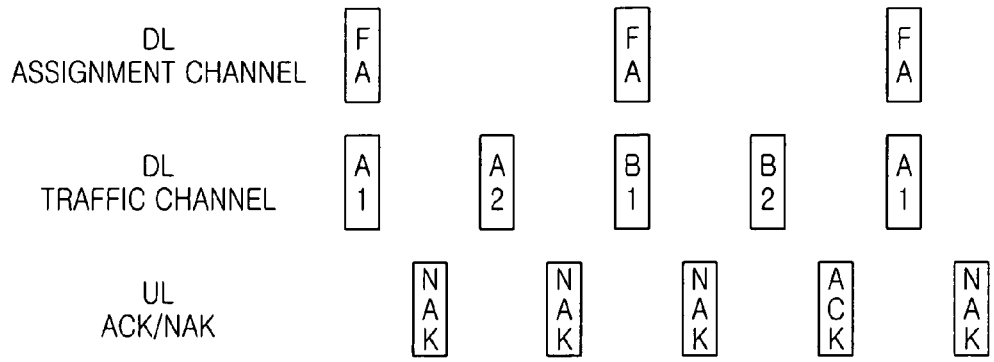
FIG. 4 is a diagram comparatively illustrating a scenario of a conventional HARQ operation and a scenario of a HARQ operation according to the present invention.
Figure 4:
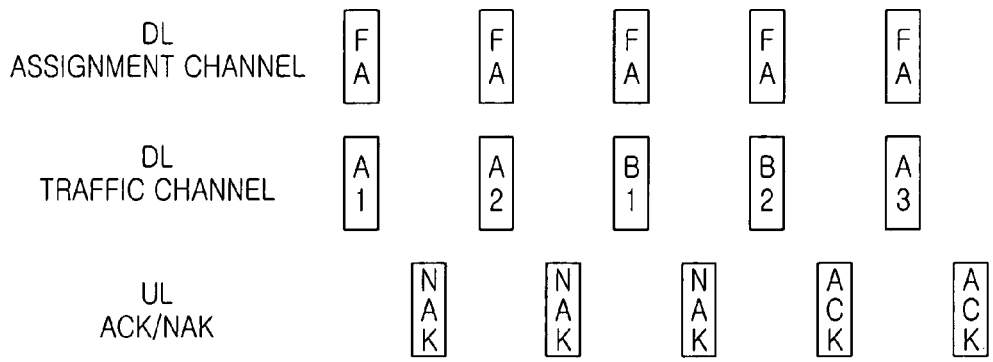
Figure 4:
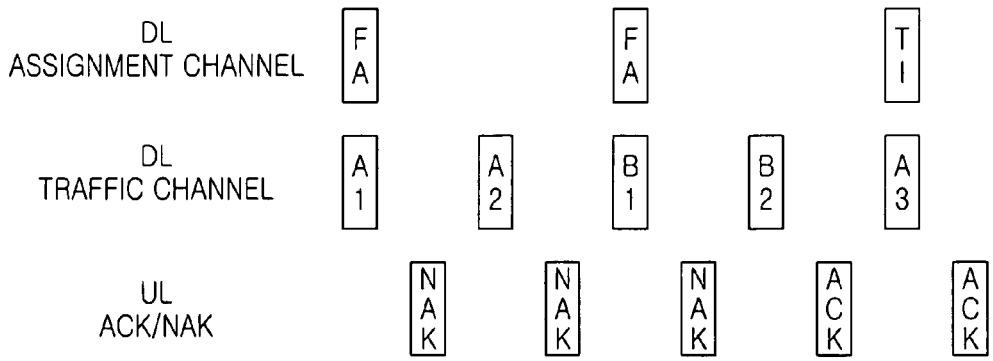

FIG. 4 is a diagram comparatively illustrating a scenario of a conventional HARQ operation and a scenario of a HARQ operation according to the present invention.

First, in a conventional HARQ operation scenario, for example, in a synchronous HARQ operation scenario, a BS transmits Full Resource Assignment Information (FA) to an MS A using a DL assignment channel for an initial packet transmission. The BS transmits a packet using a DL traffic channel to the MS A on the same time on when the BS transmits the FA or after transmission of the FA. Here, the packet initially transmitted to the MS A is called an 'A1 packet'.

The MS A transmits a NAK signal to the BS when the MS A fails to decode the A1 packet. So, the BS transmits an A2 packet to the MS A. Here, the A2 packet can be identical to the A1 packet, or can be an IR 1 packet generated using an Increment Redundancy (IR) HARQ scheme. Here, the IR 1 packet is a packet generated by adding parity information to the A1 packet in an every retransmission for improving an error correction capability. Thus, adding a parity bit to the A1 packet according to an IR scheme is a process where the A1 packet is Increment Redundancy (IR) processed. The MS A transmits a NAK signal for the A2 packet to the BS.

The BS stops packet transmission for the MS A, and determines to transmit a packet for an MS B. So, the BS transmits an FA and a packet B1. Here, the packet initially transmitted to the MS B is called a 'B1 packet'. The MS B transmits a NAK signal for the B1 packet to the BS, and the BS transmits a B2 packet to the MS B. Here, the B2 packet can be identical to the B1 packet, or can be an IR 2 packet generated using the IR HARQ scheme. Here, the IR 2 packet is different from the B1 packet. Thereafter, the MS B transmits an ACK signal for the B2 packet to the BS.

Thereafter, the BS retransmits the A1 packet to the MS A. The BS transmits an FA to the MS A before the retransmission of the A1 packet or on the same time on when the A1 packet is retransmitted.

As describe above, in a synchronous HARQ scheme, the MS A discards all of the A1 packet and the A2 packet that failed in a decoding, and waits for reception of a new packet.

Next, in the conventional HARQ operation scenario, for example, in an asynchronous HARQ operation scenario, a BS transmits an FA to an MS A using a DL assignment channel for an initial packet transmission. The BS transmits an A1 packet using a DL traffic channel to the MS A on the same time on when the BS transmits the FA or after transmission of the FA.

The MS A transmits a NAK signal to the BS when the MS A fails to decode the A1 packet. So, the BS transmits an FA and an A2 packet to the MS A. Here, the A2 packet can be identical to the A1 packet, or can be an IR 1 packet generated using the IR HARQ scheme. Here, the IR 1 packet is different from the A1 packet. The MS A transmits a NAK signal for the A2 packet to the BS.

The BS stops packet transmission for the MS A, and determines to transmit a packet for an MS B. So, the BS transmits an FA and a packet B1. The MS B transmits a NAK signal for the B1 packet to the BS, and the BS transmits an FA and a B2 packet to the MS B. Here, the B2 packet can be identical to the B1 packet, or can be an IR 2 packet generated using the IR HARQ scheme. Here, the IR 2 packet is different from the B1 packet. Thereafter, the MS B transmits an ACK signal for the B2 packet to the BS.

Thereafter, the BS transmits an FA and an A3 packet to the MS A. The BS transmits an FA to the MS A before retransmission of the A1 packet or on the same time on when the A1 packet is retransmitted.

As describe above, in an asynchronous HARQ scheme, transmission of an FA is performed in every transmission of a packet. So, the signaling overhead is incurred.

Finally, in the proposed HARQ operation scenario according to the present invention, a BS transmits an FA to an MS A using a DL assignment channel for an initial packet transmission. The BS transmits an A1 packet using a DL traffic channel to the MS A on the same time on when the BS transmits the FA or after transmission of the FA.

The MS A transmits a NAK signal to the BS when the MS A fails to decode the A1 packet. So, the BS transmits an A2 packet to the MS A. Here, the A2 packet can be identical to the A1 packet, or can be an IR 1 packet generated using the IR HARQ scheme. Here, the IR 1 packet is different from the A1 packet. The MS A transmits a NAK signal for the A2 packet to the BS.

The BS stops packet transmission for the MS A, and determines to transmit a packet for an MS B. So, the BS transmits a packet B1 to the MS B. The MS B transmits a NAK signal for the B1 packet to the BS, and the BS transmits an FA and a B2 packet to the MS B. Here, the B2 packet can be identical to the B1 packet, or can be an IR 2 packet generated using the IR HARQ scheme. Here, the IR 2 packet is different from the B1 packet. Thereafter, the MS B transmits an ACK signal for the B2 packet to the BS.

Thereafter, the BS transmits an A3 packet to the MS A. Here, in the proposed HARQ operation scenario according to the present invention, timing information must be transmitted to the MS A before transmission of the A3 packet or on the same time on when the A3 packet is transmitted. Here, the A3 packet can be identical to one of the A1 packet and the A2 packet, or can be a packet generated by adding parity information to one of the A1 packet and the A2 packet.

That is, in the present invention, a signaling overhead can be minimized by transmitting timing information indicating a timing point on which an MS receives a packet, instead of transmitting an FA according to the conventional art. And, instead of transmitting an FA on a fixed timing point according to the conventional art, in the present invention, timing information is transmitted on a variable timing point determined by a scheduler, so performance improvement according to a scheduling gain can be achieved. That is, during one HARQ procedure, resource shared with an MS B is assigned to an MS A. Until the assigned resource is newly assigned to another MS different from the MS A and MS B.

As can be understood from the foregoing description, the present invention proposes a new HARQ scheme for minimizing a signaling overhead, and improving a performance using a scheduling gain.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to transmit a packet of a Base Station (BS) in a communication system using an asynchronous Hybrid Automatic Repeat reQuest (HARQ) scheme, the method comprising:
   determining a resource for transmission of an initial packet to a Mobile Station (MS) and transmitting information of the determined resource to the MS;
   transmitting the initial packet to the MS using the determined resource;
   transmitting timing information without another resource assignment on which the initial packet is re-transmitted to the MS if the BS receives a NACK signal or no response for the initial packet from the MS; and
   re-transmitting the initial packet to the MS using the determined resource on a timing point corresponding to the timing information.

2. The method of claim 1, wherein re-transmitting the initial packet further comprises:
   adding one or more parity bits generated using an Increment Redundancy (IR) HARQ scheme to the initial packet; and
   re-transmitting the initial packet with the added parity bits.

3. The method of claim 1, further comprising:
   if a NACK signal or no-response for the initial packet from the MS is received and there is a need for assigning the determined resource to a different MS, notifying to the MS that there is a change of the determined resource.

4. A method to receive a packet of a Mobile Station (MS) in a communication system using an asynchronous Hybrid Automatic Repeat reQuest (HARQ) scheme, the method comprising:
   receiving information associated with a resource for transmission of an initial packet determined by a Base Station (BS);
   receiving the initial packet from the BS using the resource for transmission of the initial packet;
   decoding the initial packet, and transmitting a decoded result of the initial packet to the BS;
   receiving timing information without another resource assignment on which the initial packet is re-transmitted to the MS from the BS if the decoding result represents a decoding failure of the initial packet; and
   receiving the initial packet re-transmitted by the BS using the resource for transmission of the initial packet on a timing point corresponding to the timing information.

5. The method of claim 1, further comprising:
   prior to the assigned timing point, assigning the resource for transmitting another packet to another mobile station; and
   transmitting the another packet to the another mobile station using the assigned resource.

6. The method of claim 5, further comprising decoding, by the another mobile station, the another packet if the timing information is received from the base station.

7. The method of claim 4, wherein transmitting a decoding result of the initial packet to the BS includes transmitting no-response to the BS if the decoding result represents the decoding failure of the initial packet.

8. The method of claim 4, wherein the initial packet re-transmitted by the BS includes one or more parity bits generated using an Increment Redundancy (IR) HARQ scheme.

9. The method of claim 4, further comprising:
   if a notification for a change of the resource from the BS is received, waiting for reception of the initial packet until a specified period is passed,
   determining whether timing information is received from the BS, and
   the timing information is received from the BS, receiving the initial packet using the changed resource by the BS on a timing point corresponding to the timing information.

10. An apparatus configured to transmit a packet in a communication system using an asynchronous Hybrid Automatic Repeat request (HARQ) scheme, the apparatus comprising:
    a base station (BS) for configured to:
       determine a resource for transmitting an initial packet to a mobile station (MS);
       transmit the initial packet to the MS using the determined resources;
       transmit timing information without another resource assignment on which the initial packet is re-transmitted to the MS if the BS receives a NACK signal or no response to the initial packet from the MS; and
       re-transmit the initial packet to the MS using the determined resource on a timing point corresponding to the timing information.

11. The apparatus of claim 10, wherein the BS is configured to add one or more parity bits generated using an Increment Redundancy (IR) HARM scheme to the initial packet, and re-transmit the initial packet including the added parity bits.

12. The apparatus of claim 10, wherein the BS is configured to notify the MS that there is a change of the determined resource if a NACK signal or no response to the initial packet from the MS is received, and there is a need for assigning the determined resource to a different MS.

13. The apparatus of claim 10, wherein the BS is further configured to generate the first packet and the second packet using an identical Modulation and Coding Scheme (MCS) level.

14. The apparatus of claim 10, wherein the base station is configured to assign the resource for transmitting another packet to another mobile station prior to the assigned timing point, and to transmit the another packet to the another mobile station using the assigned resource.

15. The apparatus of claim 14, wherein the MS is further configured to decode the another packet if the timing information is received from the base station.

16. An apparatus configured to receive a packet in a communication system using an asynchronous Hybrid Automatic Repeat reQuest (HARQ) scheme, the apparatus comprising:
    a Mobile Station (MS) configured to:
       receive information associated with a resource for transmission of an initial packet determined by a Base Station (BS);
       receive the initial packet from the BS using the resource for transmission of the initial packet;
       decode the initial packet;
       transmit a decoding result of the initial packet to the BS;
       receive timing information without another resource assignment from the BS;
       receive timing information on which the initial packet is re-transmitted to the MS from the BS if the decoding result represents a decoding failure of the initial packet; and
       receive the initial packet re-transmitted by the BS using the resource for transmission of the initial packet on a timing point corresponding to the timing information.

17. The apparatus of claim 16, wherein the initial packet re-transmitted by the BS includes one or more parity bits generated using an Increment Redundancy scheme added to the initial packet.

18. The apparatus of claim 16, wherein the MS is configured to:
- wait for reception of the initial packet until a specified period is passed if a notification for a change of the resource from the BS is received;
- determine whether timing information is received from the BS; and
- if the timing information is received from the BS, receive the initial packet using the changed resource by the BS on a timing point corresponding to the timing information.

19. The apparatus of claim 16, wherein the MS is configured to transmit no response to the BS if the decoding result represents a decoding failure of the initial packet.

\* \* \* \* \*